United States Patent
Pettit

[15] 3,683,747
[45] Aug. 15, 1972

[54] MANIPULATOR AND MANIPULATOR CONTROL SYSTEM

[72] Inventor: Robert Halsey Pettit, Huntington, N.Y.

[73] Assignee: Sperry Rand Corporation

[22] Filed: Feb. 9, 1970

[21] Appl. No.: 9,758

[52] U.S. Cl....................................91/413, 91/414
[51] Int. Cl..............................................F15b 11/16
[58] Field of Search.......91/413, 414, 411 R; 60/97 P

[56] References Cited

UNITED STATES PATENTS

| | | | |
|---|---|---|---|
| 2,643,515 | 6/1953 | Harsch | 91/414 X |
| 2,698,664 | 1/1955 | Freeman | 91/413 X |
| 2,724,620 | 11/1955 | Johnson et al. | 91/414 X |
| 3,084,817 | 4/1963 | Lovrenich | 60/97 P X |
| 3,212,409 | 10/1965 | Mash | 91/413 X |

Primary Examiner—Edgar W. Geoghegan
Attorney—S. C. Yeaton

[57] ABSTRACT

A powered, remotely controllable manipulator system having a novel linkage configuration affording a maximum degree of flexibility of operation is disclosed. A plurality of telescoping linkage elements cooperates to provide reproducible angular motion and extension and contraction of the manipulator structure. The structure supports a powered gimbal system permitting independent angular adjustment of a tool mounted thereupon over and above the angular adjustability supplied by the powered telescoping linkage system.

23 Claims, 13 Drawing Figures

INVENTOR
ROBERT H. PETTIT
BY
*H.P. Terry*
ATTORNEY

INVENTOR
ROBERT H. PETTIT
BY
ATTORNEY

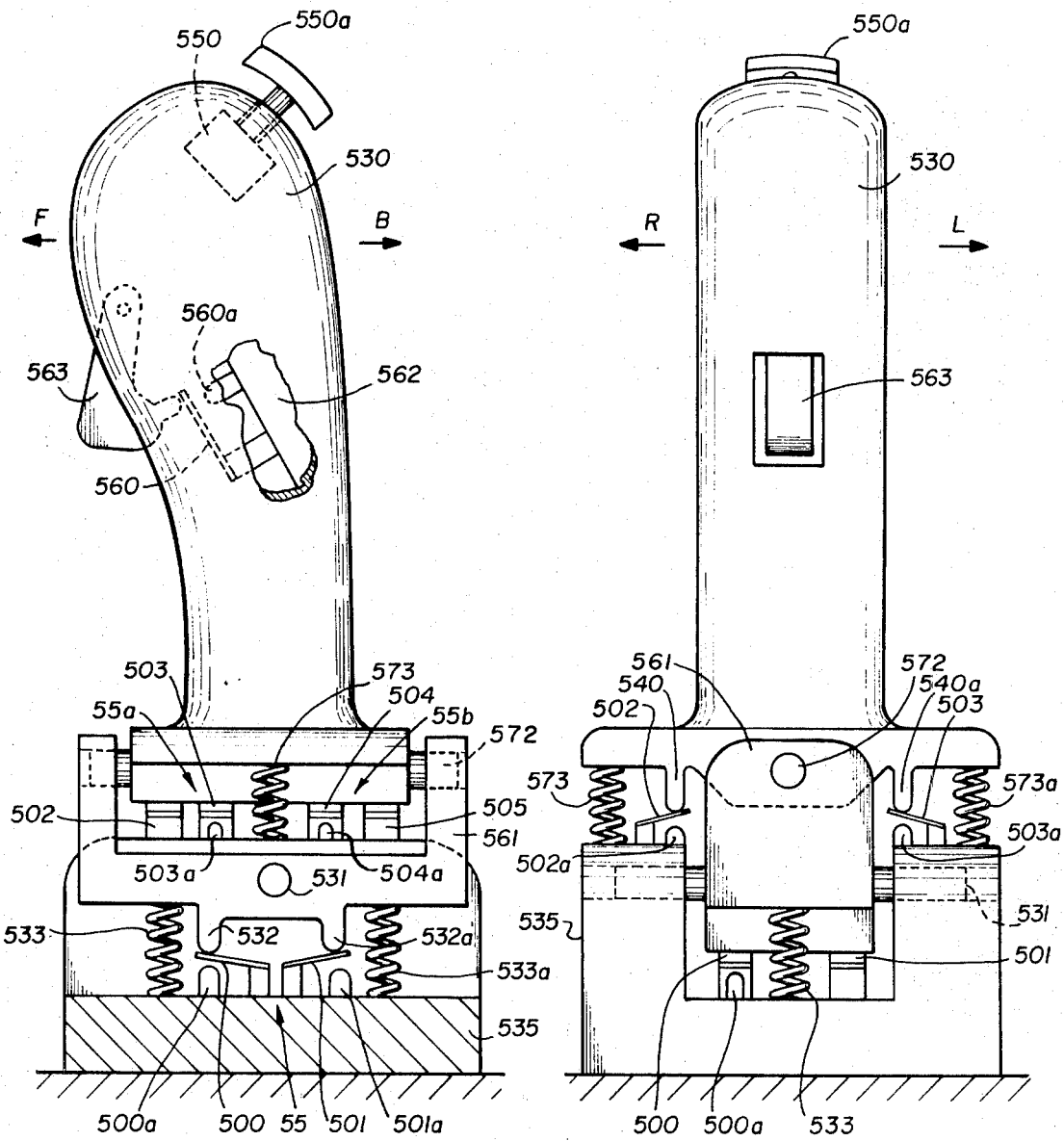

MANIPULATOR AND MANIPULATOR CONTROL SYSTEM

BACKGROUND OF THE INVENTION

1. Field of the invention

The invention pertains to powered, remotely controlled manipulator devices and particularly to a class of powered, remotely controlled manipulator devices for positioning and controlling selected or interchangeable tools while operating in a hostile environment under the control of a human operator located at a distance from the hostile environment.

2. Description of the Prior Art

Remotely controllable manipulator devices have been proposed in the prior art for sundry applications and have been demonstrated with various degrees of success. Substitute mechanical arms, for example, having linkages analagous to those of the human arm, and properly fitted to persons crippled by the loss of an arm, have allowed many to return to gainful occupation and to relatively normal lives. Such arms have sometimes been powered to a satisfactory degree by cooperative use of remaining undamaged muscle tissue. Torque amplifiers have sometimes been used to aid weak muscles satisfactorily to operate mechanical prosthetic arms.

For certain more strictly remote control applications, manipulators have been designed still using essentially the type of linkage inherent in the human arm. Electric torque motors have been supplied at each joint in the linkage system, such as at the "shoulder", "elbow," or "wrist" of the assembly. First used with good results to handle analysis and synthesis of small quantities of radioactive chemicals from a remote location with the protection of an intervening radiation shield, such arrangements have also been considered for more demanding applications, including the handling of relatively bulky and heavy materials in environments considerably more difficult than that of the radioactive manipulator.

The manipulator designs under consideration for permitting remotely controlled operation of various tools in deep underwater and in outer space environments have also generally been based on the human arm analog. As a consequence of this choice, problems have arisen because of the awkward bulk and weight of these systems. In such applications, relatively powerful and therefore heavy tools are required. The need to use torquing motors at each elbow or other pivot in the linkages further increases the bulk and weight of the assembly. Certain designs are found consequently to lack reliability, though a requirement is often present for long service capability without access for maintenance. Some arrangements have been particularly vulnerable to damage and to the effects of corrosion. Above all, the human arm type of linkage is not well adapted to supporting or moving a heavy mass when fully extended, and is also awkward in its operation in many applications where a mode involving mere extension is required.

SUMMARY OF THE INVENTION

The invention is an electrohydraulically powered, remotely controllable manipulator system capable of operating tools or handling bulky or heavy objects in a hostile atmosphere or environment while under the control of a remotely located operator. A feature of the invention is a novel linkage system, for positioning a tool or other object, that incorporates a plurality of controllably telescopable linkage elements permitting a broad range of angular motion of the linkage system and also its expansion or contraction so that close or distant objects may readily be reached. The telescoping linkage configuration further supports a hydraulically powered, remotely controllable gimbal system for providing independent motion of the supported tool relative to the motion of the telescoping structure.

BRIEF DESCRIPTION OF THE DRAWINGS

FIG. 1a is an elevation view showing the location of gimbal or pivot elements for supporting the structure shown in FIG. 1.

FIG. 11 is an elevation view, partly in cross section, of a manual controller for use with the system of FIG. 1.

FIG. 12 is a second elevation view of the apparatus of FIG. 11.

DESCRIPTION OF THE PREFERRED EMBODIMENT

Figure 1:
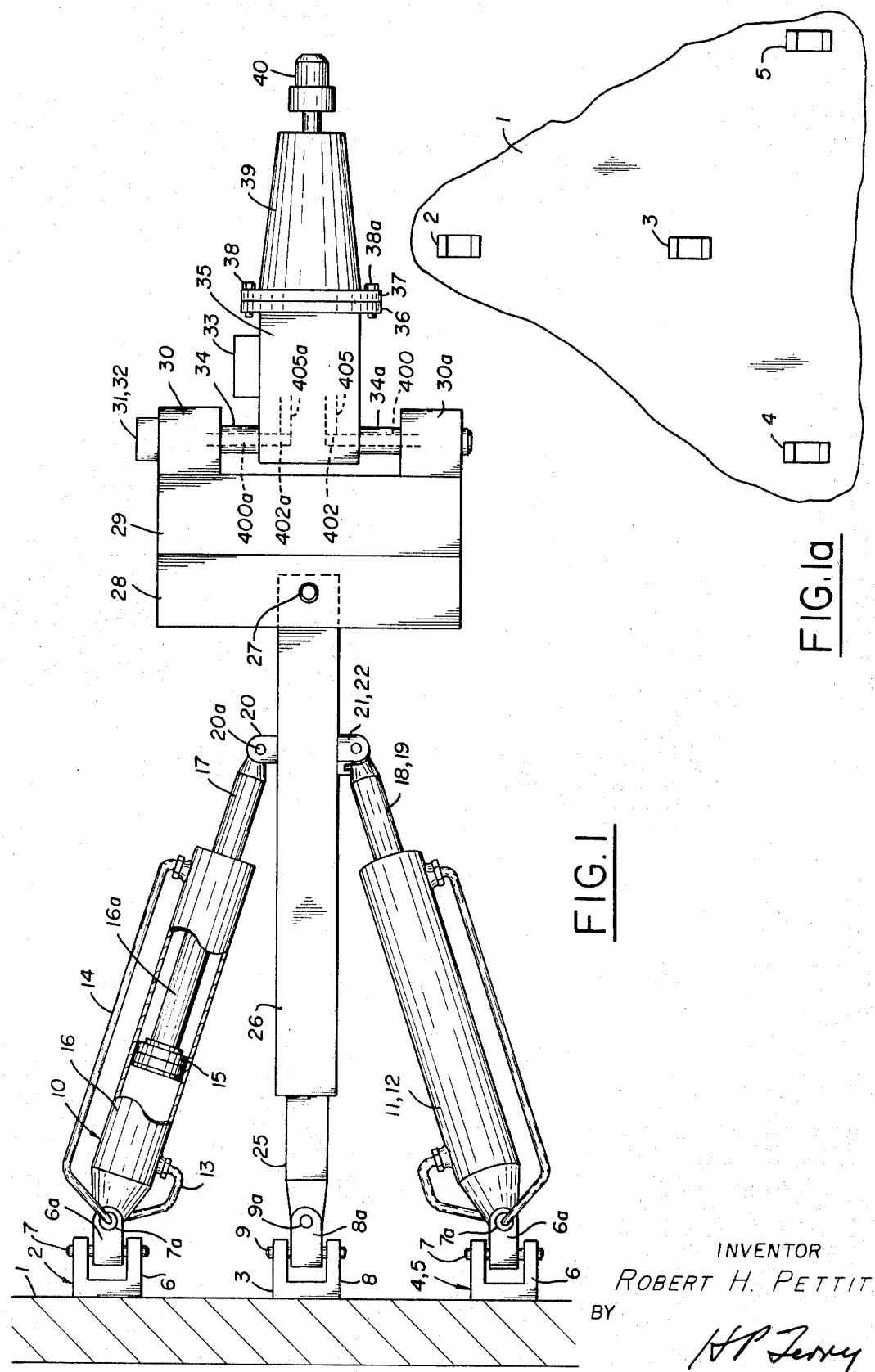
FIG. 1 is an elevation view, partly in cross section, of a preferred embodiment of the invention.

In FIG. 1, the novel manipulating system is shown extending from a supporting wall 1; more particularly, general relations of the working parts of the manipulator are illustrated. The manipulator will be described with reference to azimuth and elevation or pitch axes, but it is to be understood that these axes may be reversed or that other axes may be used according to the manipulation problem at hand. Generally, the manipulator system illustrated in FIG. 1 will be operated in a hostile environment and control devices or human operators behind the protection wall 1 will control the manipulator. Wall 1 therefore, in addition to having appropriate mechanical strength, will furthermore have such properties as are required, for example, to protect the human operators. Wall 1 may be fixed to the earth or may be mobile.

The manipulator system, per se, is mounted to project from a multiple gimbal or pivoting system affixed to the support wall 1 and permitting the desired number of degrees of freedom of motion of the manipulator. For example, gimbal support devices 2, 4, and 5 are seen in FIGS. 1 and 1a to be mounted at the apices of a substantially symmetric triangle on wall 1, while gimbal 3 is mounted centrally within that triangle. In FIG. 1, gimbal 4 is above the plane of the drawing, while a similar gimbal 5 lies below the plane of the drawing. Gimbals 2, 4, and 5 are each similar mechanical gimbals or pivot systems specially arranged to convey hydraulic fluid into manipulator actuators 10, 11, and 12, respectively, as will be described in more detail with reference to FIGS. 4 and 5. Similarly, the centrally located gimbal 3 is equipped to convey high pressure hydraulic fluid into the manipulator system via apparatus enclosed within tubes 25 and 26 and to permit the return flow of such fluid.

The manipulating system is built around the telescoping unit comprising square tubes 25 and 26, whose details will be given in the description to follow of FIG. 6. In the telescoping tube arrangement, gimbal yoke 8 is affixed to wall 1 and supports an azimuth shaft 9 and that, in turn, supports an associated gimbal yoke 8a supporting, in turn, a pitch shaft 9a. Shaft 9a extends through a suitably shaped connector portion of the square telescoping tube 25, which tube as is seen from the drawing is adapted to slide within the interior of the square telescoping tube 26.

The telescoping system including the square tubes 25 and 26 has several functions in addition to functioning as a central element of the manipulator. For example, a shaft 27 projects through square tube 26 to support a tool control system seen in the right hand portion of FIG. 1. More particularly, the system comprising telescoping tubes 25 and 26 may be moved in azimuth and elevation by the three similar hydraulic actuators associated respectively with gimbals 2, 4, and 5, these actuators being numbered 10, 11, and 12.

The structure and operation of hydraulic actuators 10, 11 and 12 will be understood from the following discussion of the typical actuator 10. Actuator 10 is a conventional hydraulic lineal actuator having pivots 7a and 20a, pivot 7a being located in gimbal yoke 6a and pivot 20a in a yoke 20 fastened to an upper flat surface of telescoping tube 26 toward the end of tube 26 at which shaft 27 is located.

As shown in the cut-away view of hydraulic actuator 10, it employs a standard casing 16 pivoted at shaft 7a and a conventional hydraulic piston 15 connected to the actuator arm 16a within the casing. The exterior end 17 of translatable actuator arm 16a is connected to pivot 20a. As will be explained in further detail, high pressure hydraulic fluid may be introduced through gimbal 2 and through pipe 14 at one end of actuator 10 to the interior of casing 16 if, for example, the telescoping system 25, 26 is to be moved upward around shaft 9a of gimbal 3. During such operation, hydraulic fluid is returned through wall 1 from actuator 10 via pipe 13 and a separate set of oil passage ways within gimbal 2. Both the high pressure and sump fluids pass through the support wall 1, as will be described. Should it be desired to lower the telescoping system comprising arm 25, 26, high pressure fluid may be introduced into the volume on the opposite side of piston 15 through pipe 13, the return fluid path employing pipe 14. Thus, yoke 20 may be moved upward if the hydraulic pressure on the pivot 20a side of piston 15 is greater than that on the pivot 7a side, and vice versa. As will be seen, lineal actuator 10 may be operated by a rate control, by a positional or other control system, or by the control system yet to be described with reference to FIGS. 2 and 3.

Similarly, a second lineal hydraulic actuator 11 is shown pivoted at one end on the pitch shaft 7a of gimbal 4 in a yoke 6a supported upon azimuth shaft 7 of gimbal yoke 6. The translatable portion 18 of actuator 11 is pivoted in a yoke 21 mounted at the lower flat surface of the telescoping square tube 26. It is understood that gimbal 4, actuator 11, and actuator element 18 lie in a plane directed increasingly above the plane of the drawing as gimbal 4 is approached.

A lineal hydraulic actuator system 12, 19 similar to actuator 11, 18 is located in FIG. 1 behind that actuator. As also seen in FIG. 1a, it is coupled from a gimbal system 5 lying below the plane of FIG. 1 and at its second end to a yoke 22 behind yoke 21. Thus, one lineal hydraulic piston actuator 10 is found above the telescoping system comprising elements 25, 26 and two such hydraulic actuators are located below the telescoping system.

According to the invention, actuators 10, 11, and 12 may be used cooperatively to effect several types of motion. The actuators may be operated individually or in concert. Any one of actuators 10, 11, 12 may be individually extended or contracted or they may be operated in pairs to determine any desired angular relation of the telescoping elements 25 and 26 with respect to the support wall 1. It will also be understood that such types of operation of actuators 10, 11, 12 may produce corresponding relation motion between telescoping tubes 25 and 26 and thus may position shaft 27 at a new radial distance with respect to gimbal 3 or wall 1. For example, if actuators 10, 11, 12 are equally extended from the position shown in the drawing of FIG. 1, the angular relation of telescoping tubes 25 and 26 with respect to wall 1 may remain at substantially 90°, while shaft 27 is simply moved to a new distance from wall 1. The position of shaft 27 may be precisely moved about with maximum repeatability, since the square telescoping tubes 25, and 26 do not permit rotation about the axis of tubes 25 and 26.

It is to be understood that suitable motion limit stop mechanisms may be applied to determine the boundaries of allowable translation of each of actuators 10, 11, and 12. Such limit stops, for instance, may be adapted to remove power from the associated lineal actuator at a preselected limit position so that incorrect commands instituted by the operator or consequent to equipment failure cannot damage the manipulator equipment.

Figure 7:
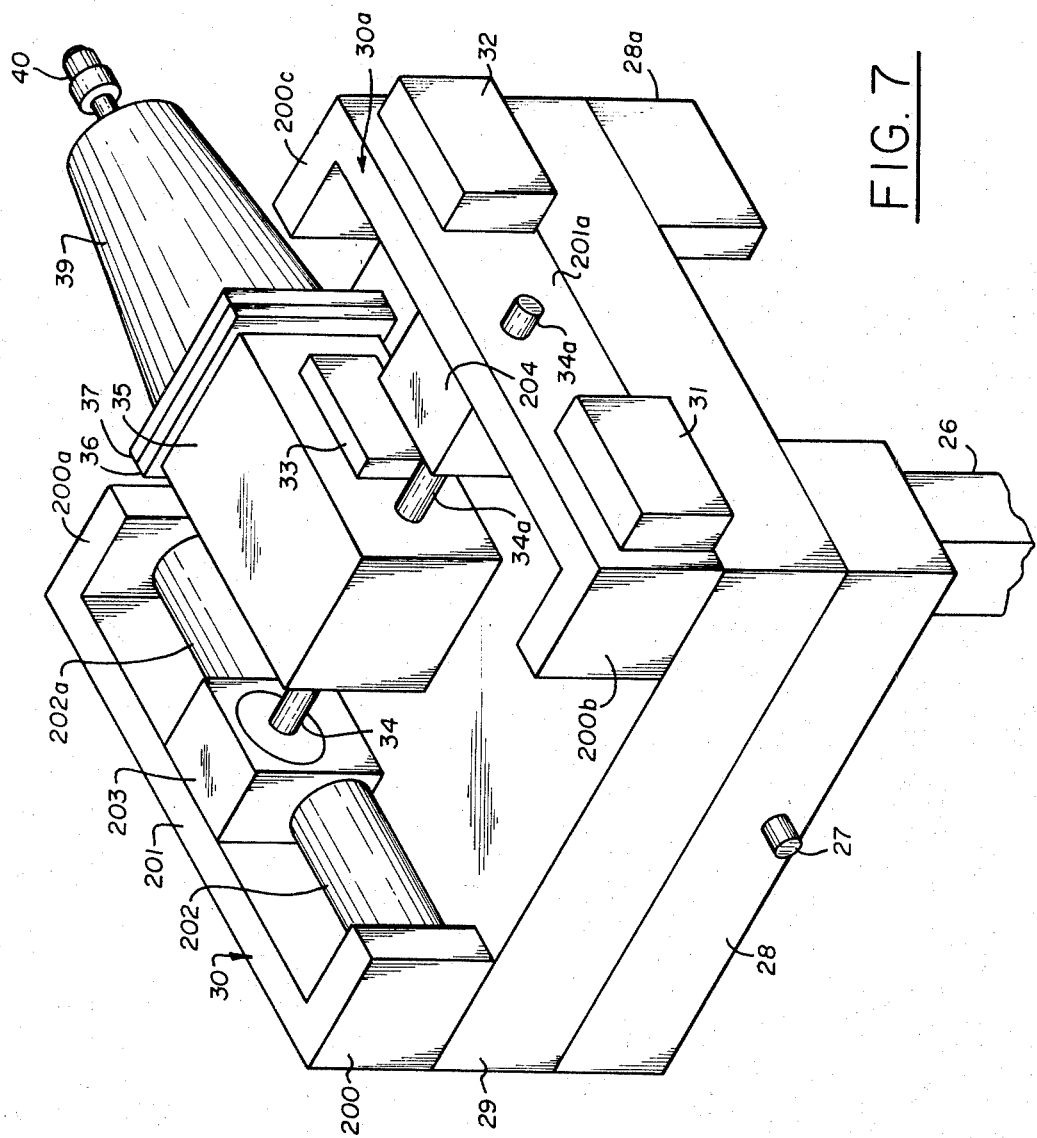
FIG. 7 is an isometric view of a part of the apparatus shown in FIG. 1.

The manipulator system relies upon actuators 10, 11 and 12 and the telescoping system comprising tubes 25 and 26 to permit the operator to control the location of shaft 27 and therefore similarly to control the location of apparatus mounted on shaft 27. As seen in FIGS. 1 and 7, such apparatus includes a first minor manifold system 28 about shaft 27, a major manifold system 29, and a second minor manifold system 30, including hydraulic actuators which controllably rotate shaft 34, 34a.

As will be seen in further discussion of FIGS. 7 to 10, the manifold system illustrated in FIG. 1 is capable of positioning a tool at the will of the operator. For this purpose, there is mounted on shaft 34, 34a, a tool manifold 35 including a mounting flange 36. Upon mounting flange 36, it is possible to mount by fastenings, such as bolts 38, 38a, any one 39, 40 of a variety of useful tools. Such tools actually form no particular part of the present invention, as a variety of useful tools may be interchangeably employed by the manipulator. The tool illustrated which is a conventional hydraulic-powered impact wrench or drill modified to cooperate with flange 36, is merely representative of tools which could be mounted from flange 36. In the drawing, the impact wrench device includes a reversible variable-speed hydraulic motor contained in the case 39 with an output shaft on which a suitable chuck 40 is located for holding a wrench, drill, or the like.

Other tools, such as magnets for lifting metal objects, may readily be mounted in dependent relation from tool manifold 35. For certain applications in which it is not readily possible for the operator directly to view the working of the tool in use, a television camera tube may be located adjacent the tool manifold 35, along with suitable high intensity lights for illuminating the tool and the object upon which the tool is to perform useful work.

Figure 2:
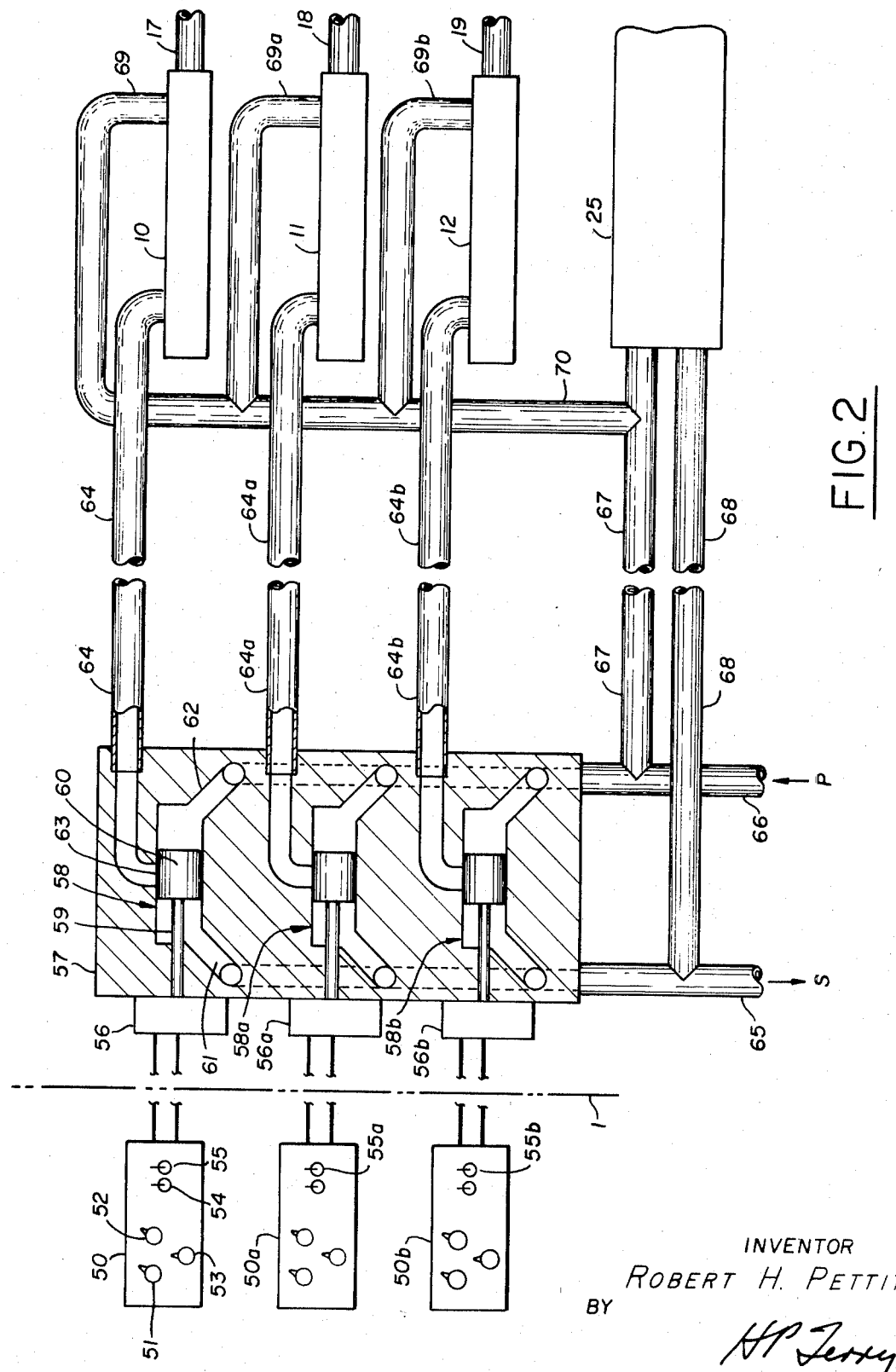
FIG. 2 is a view showing schematically a part of the electrohydraulic control for the device of FIG. 1.

FIG. 2 is an aid in explaining apparatus primarily for use in controlling actuators 10, 11, and 12 of the manipulator system of FIG. 1. In FIG. 2, the support wall 1 is represented merely by a dot-dash line 1 and actuators 10, 11, and 12 with respective actuator output arms 17, 18, 19 are shown schematically with the same reference numbers as are employed in FIG. 1. Also illustrated in a schematic manner is the telescoping tube 25 which forms one element of the telescoping system 25, 26 of FIG. 1.

The apparatus for controlling the individual actuators 10, 11, and 12 includes a source of hydraulic fluid under pressure (not shown) connected to pipe 66 and a sump (not shown) connected to pipe 65. Source and sump may be located to the left of wall 1. Furthermore, it comprises also the operator or control side of wall 1, similar electronic control elements 50, 50a, and 50b to be discussed in detail in connection with FIG. 3. Electromechanical controls or actuators 56, 56a, and 56b and the respective hydraulic control valves 58, 58a, and 58b, all are associated merely for convenience, with a single manifold 57. These elements may be affixed on either side of wall 1 in any convenient manner.

A first channel including electronic control element 50, electromechanical control 56, hydraulic differential control valve 58, and actuator 10 is typical of the second and third channels which respectively control hydraulic actuators 11 and 12. For example, the first channel, for controlling the position of actuator arm 17, utilizes an electronic control 50, which, as will be seen, is supplied with adjustable control elements 51, 52, 53, and switches 54 and 55. Switch 54 may, for example, be used to supply power to the controller 50. On the other hand, switch 55 is a three position reversing switch which has the effect of reversing the output connections of controller 50 and thus determines the polarity of the signal supplied to electromechanical actuator 56.

Adjustable control elements 51 and 52 may be employed to change the gain of the controller or, in other words, to control the rate of response of the system, while control element 53 may be employed as a bias controller for reasons yet to be discussed. The variable amplitude, reversible polarity direct current signal applied by controller 50 to electromechanical actuator 56 determines the sense in which the latter operates. Such electromechanical actuators as actuators 56, 56a, and 56b are well known in the art, being discussed in the U.S. Pat. No. 2,864,239, issued Dec. 16, 1958 to G.H. Taylor and in the U.S. Pat. No. 3,033,171, issued May 8, 1962 to J.H. Engelbrecht et al.

Actuator 56 functions as a first stage electromechanical controller, moving the shaft 59 of a hydraulic differential controller valve 58, such as disclosed in the above mentioned Taylor patent, and thus positioning the valve land 60 with respect to orifice 63 of the output hydraulic line 64. As is conventional, the chamber of actuator 58 is connected at its ends via pipes 61 and 62, respectively, to hydraulic pressure pipe 66 and to the sump line 65. Thus, depending upon the command generated in electronic controller 50, high pressure fluid is supplied to one end or the other of actuator 10, actuator arm 17 is repositioned, and telescoping tubes 25 and 26 may be relatively moved correspondingly. Controller 50a cooperates in a similar manner with electromechanical actuator 56a, differential control valve 58a, and actuator 11 to position actuator arm 18. Similarly electronic control 50b cooperates with electromechanical actuator 56b, differential control valve 58b, and actuator 12 to determine the position of actuator arm 19. Independent of the action or position of actuators 10, 11, and 12, hydraulic connections 67 and 68 are respectively maintained between apparatus within square tube 25 and the source and sump lines 65 and 66.

Figure 3:
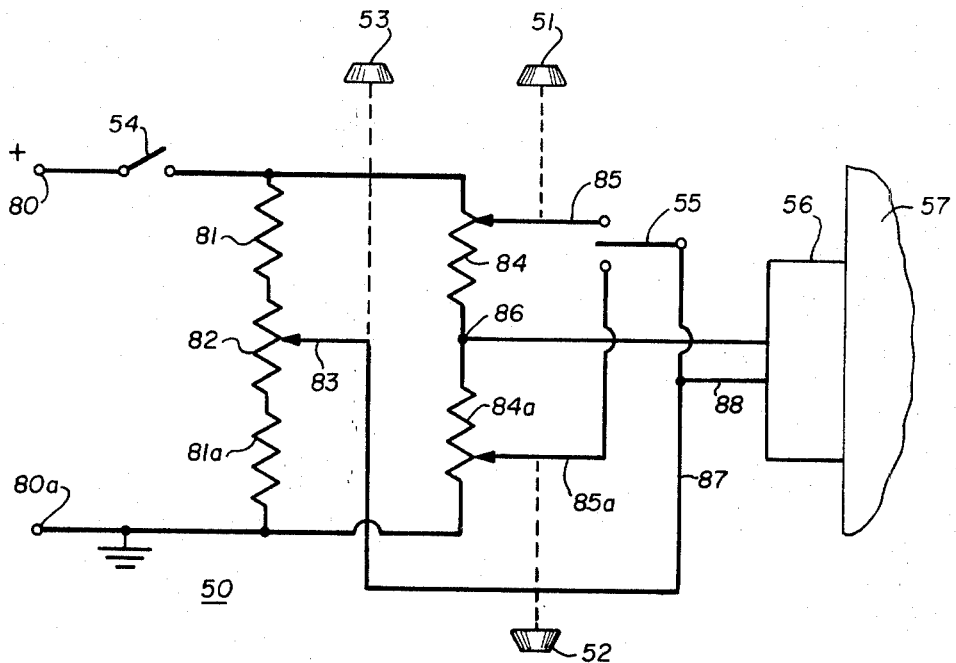
FIG. 3 is an electrical wiring diagram of part of the electrohydraulic control of FIG. 2.

FIG. 3 shows an electrical circuit suitable for performing the function of electronic controller 50. A source (not shown) of unidirectional potential is coupled to terminals 80, 80a in series relation with switch 54 and fixed resistors 81 and 81a on each side of potentiometer 82. In shunt with the resistor system 81, 82, 81a is a pair of similar potentiometers 84, 84a. The movable wiper 83 of potentiometer 82 is set according to the position of adjustable control 53 and is coupled via lead 87 to one input lead 88 of electromechanical control 56. Electromechanical controls 51, 52 are mechanical aids for establishing the respective positions of wipers 85 and 85a which are respective parts of potentiometers 84 and 84a. Switch 55 is a three-position reversing switch whose blade is capable of connection to wiper 85 in one position, to an open or unused contact in a mid-position, and to wiper 85a in a third position. The blade of switch 55 is always connected to lead 88 and thus to one input of electromechanical control 56. The second input to control 56 is established by a lead coupled to the junction 86 between potentiometers 84 and 84a.

In use, the operator closes switch 54, supplying a voltage across resistance arrays 81, 81a, 82 and 84, 84a. If a command to extend arm 17, for instance, is required, switch 55 is moved to contact the terminal connected to wiper 85 of potentiometer 84. The setting of control 51 may be used to determine the rate of motion of arm 17. If opposite motion of arm 17 is needed, switch 55 is moved to contact the lead connected to wiper 85a of potentiometer 84a. The setting of control 52 may be used to control the rate of motion of arm 17. Control 53 determines the position of wiper 83 associated with potentiometer 82 and is of use especially in certain types of known open loop controls which evidence drift effects. By the proper adjustment of control 53, drift is eliminated as when switch 55 is in its neutral position and arm 17 is to remain stationary.

Figure 4:
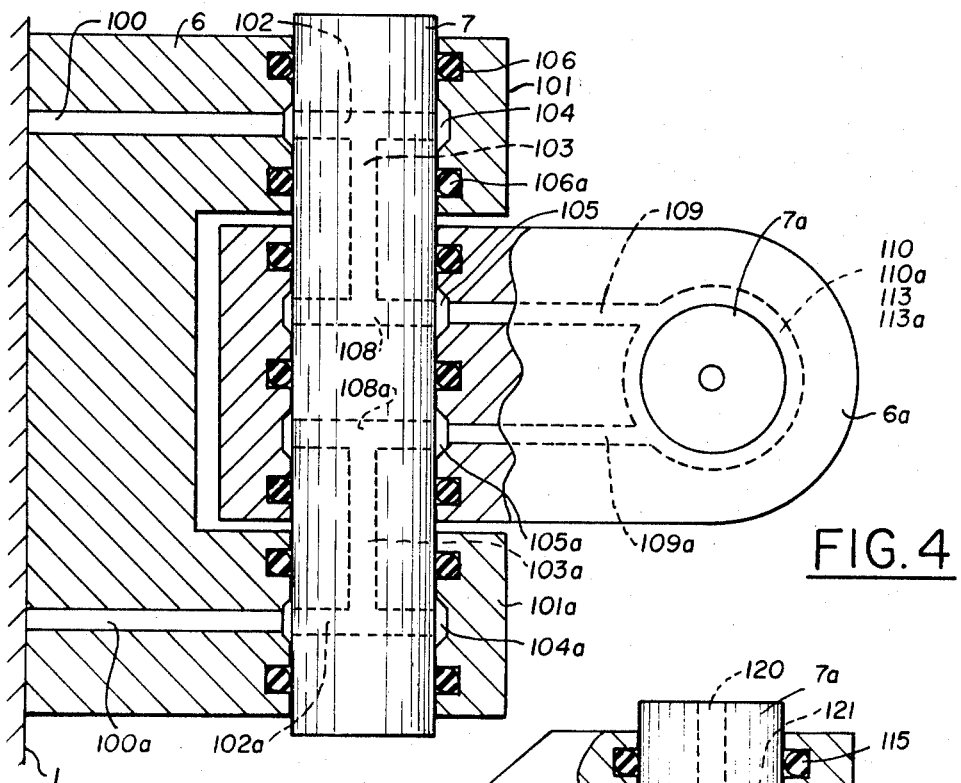
FIG. 4 is an elevation view, partially in cross section, of a gimbal or pivot support used in the apparatus of FIG. 1.
Figure 5:
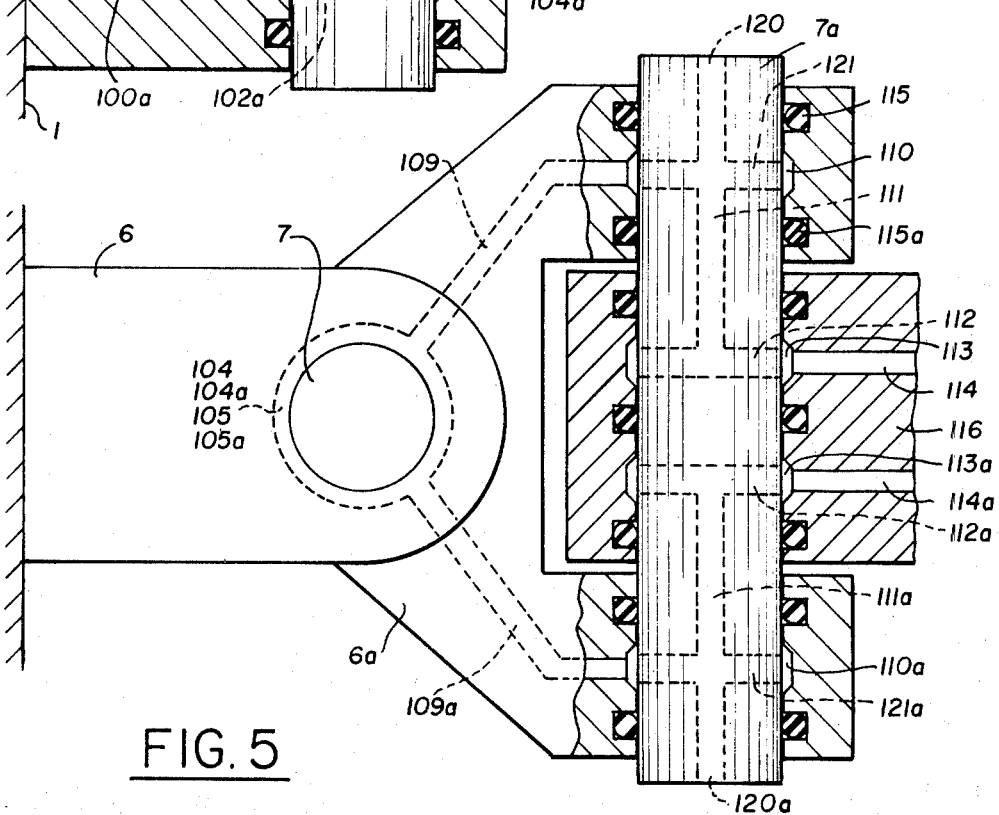
FIG. 5 is a plan view, partially in cross section, of the gimbal support of FIG. 4.

It has been observed from FIGS. 1 and 2 that hydraulic oil must flow relative to hydraulic control valves 58, 58a, and 58b through respective pivots or gimbals 2, 4, and 5 of a first type to reach actuators 10, 11, and 12. Oil must also flow from pipes 67 and 68 through a modified gimbal 3 to reach the telescoping system comprising square tubes 25, 26. FIGS. 4 and 5 illustrate such fluid transmitting gimbals or pivots.

As seen in FIGS. 4 and 5, the type of gimbal employed as gimbals 2, 4, and 5 has a conventional U-shaped yoke 6 affixed to wall 1, as by welding, supporting an azimuth axis gimbal or pivot shaft 7. Rotatably mounted on shaft 7 between the arms 101, 101a of yoke 6 is a U-shaped yoke 6a supporting pitch axis shaft 7a. Pitch axis shaft 7a is employed as a bearing element for providing a pivot for the casing 16 of actuator 10 (FIG. 1), for example.

To provide the flow of high pressure fluid in two directions through the gimbal, azimuth axis yoke 6 is provided with bores 100,100a matching similar bores in wall 1 to which, for example, pipes 64 and 67 (FIG. 2) may be connected. Bore 100 ends at annular groove 104 surrounding azimuth shaft 7 in arm 101, while bore 100a similarly opens into annular groove 104a surrounding azimuth shaft 7 in arm 101a. Wherever annular grooves such as groove 104, 104a are employed, companion annular grooves enclosing ring gaskets under compression are employed, such as at 106, 106a in association with annular groove 104, for example. Leakage of fluid along the interface between shafts and gimbal yokes is thus prevented, as for example along the interface between azimuth shaft 7 and yoke 6, or between shaft 7a and yoke 6a. Such annular grooves are sometimes called hydraulic slip rings.

Fluid paths are provided through azimuth axis shaft 7 to pitch axis yoke 6a. For example, a radial bore 102 is established in azimuth shaft 7 in alignment with annular groove 104. An axial bore 103 connects radial bore 102 with a second radial bore 108; bore 108 is aligned with annular groove 105 in pitch axis yoke 6a. Similarly, radial bore 102a cooperates with annular groove 104a and bore 100a to supply fluid via axial bore 103a to radial bore 108a and thence to annular groove 105a. Thus, independent fluid paths are afforded between the respective bores 100 and 100a in yoke 6 to annular grooves 105, 105a in pitch axis yoke 6a. It is also seen that grooves 105, 105a independently couple hydraulic fluid to the respective bores 109, 109a in pitch axis yoke 6a.

Referring particularly to FIG. 5, it is seen that the oil-channelling configuration associated with pitch axis shaft 7a may be similar to that of FIG. 4. For example, bore 109 in pitch axis yoke 6a couples to an annular passage or groove 110 surrounding a first end of pitch axis shaft 7a, while the independently connected annular groove 110a surrounds a second end of pitch axis shaft 7a.

For performing the function of the actuator gimbals 2, 4, and 5, the axial channel bores 111, 111a respectively coupling to radial bores 121, 121a are not present and axial bores 120, 120a are used in lieu thereof. For example, axial bore 120 is adapted to connect directly to pipe 13 of actuator 10 (FIG. 1), while axial bore 120a is adapted to connect directly to pipe 14 of actuator 10. In the gimbals used as pivot gimbals 2, 4, and 5, bores 112 and 112a may be absent or closed as well as grooves 113, 113a and bores 114, 114a.

In operation, it is thus seen that a continuous path between pressure line 66 of FIG. 2 and actuator 10 is provided through gimbals 2, 4, and 5 as in FIGS. 4 and 5. For example, a continuous path is provided through bores 100 and 102, annular groove 104, bores 103 and 108, annular groove 105, bore 109, annular groove 110, bores 121, and 120, to pipe 13 and one side of actuator 10. Likewise, a continuous fluid path is provided through bores 100a and 102a, annular groove 104a, bores 103a and 108a, annular groove 105a, bore 109a, annular groove 110a, bores 121a and 120a to pipe 14 and to the opposite side of actuator 10. Furthermore, the region between the arms of pitch axis yoke 6a is employed as a pivot for the solid end of the casing 16, for example, of actuator 10. It is further understood that leakage of hydraulic fluid along the interface between pitch axis shaft 7a and gimbal yoke 6a is prevented by the use of compressed gaskets located in grooves on each side of hydraulic grooves, such as grooves 110 and the associated leakage prevention gaskets 115, 115a.

Gimbal system 3 is associated with the telescoping square tubes 25, 26. For the purpose of supplying high pressure oil flow through tubes 25, 26, the azimuth axis portion of gimbal 3 is similar to that of gimbals 2, 4, and 5. However, the pitch axis system differs primarily in that oil flow is directed through bores 120, 120a at the ends of pitch axis shaft 7a. Accordingly, the gimbal system 2 has no bores 120, 120a. Furthermore, radial bores 121, 121a now respectively communicate with axial bores 111, 111a (FIG. 5). Bores 111, 111a respectively couple to radial bores 112, 112a which, in turn, communicate with annular grooves 113, 113a in pivot end 116 of square tube 25 and with the respective bores 114, 114a whose function will be discussed in further detail in connection with FIG. 6.

It is thus seen that a continuous hydraulic path is established in gimbal 3 from bore 100 of FIG. 4 to annular groove 110 of FIG. 5, through bores 111 and 112 and annular groove 113 to bore 114 in pivot end 116. Likewise, there is provided a continuous fluid path through bore 100a of FIG. 4 to annular groove 110a of FIG. 5, bores 111a and 112a, and annular groove 113a to bore 114a in pivot end 116. Integrity of operation of gimbals 2, 3, 4 and 5 is maintained by usual well known techniques so that shafts 7 and 7a maintain conventional geometrical relation with respect to yokes 6 and 6a and pivot 116 at all times.

Figure 6:
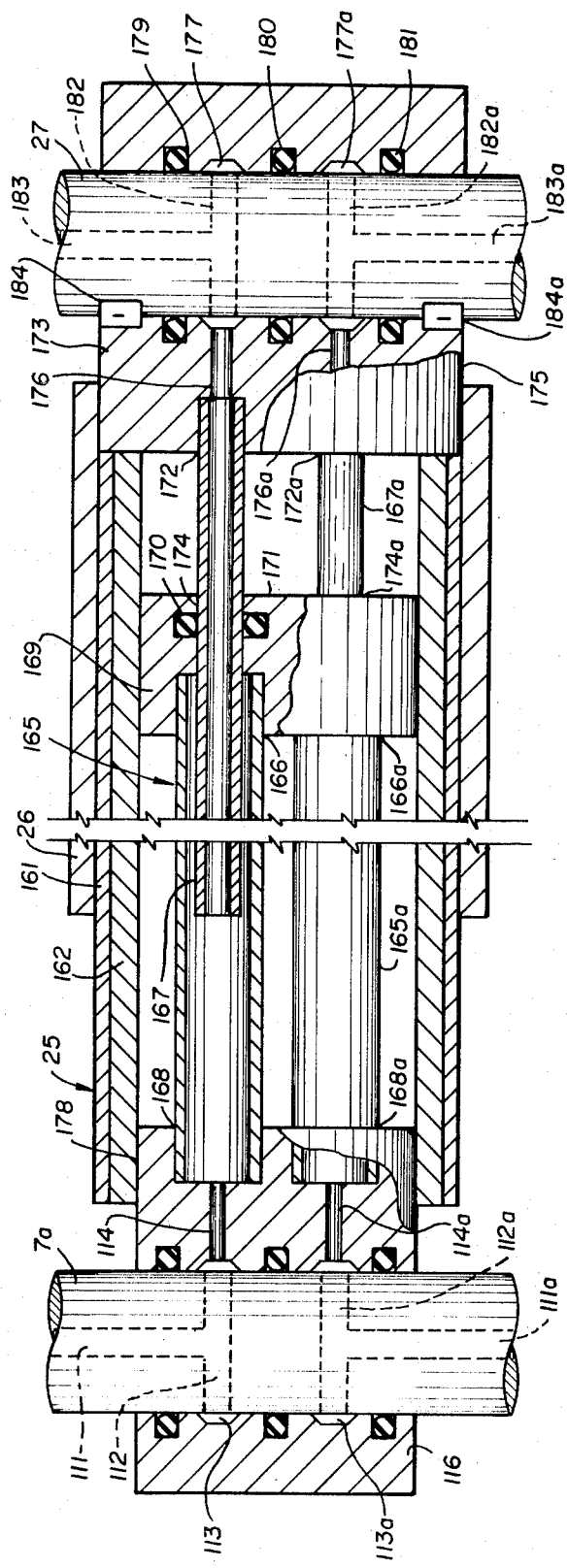
FIG. 6 is a plan view, partly in cross section, of a telescoping element of FIG. 1.

FIG. 6 illustrates the telescoping tube system shown in FIG. 1 as utilizing square tubular members 25 and 26 pivoted in gimbal 3, supporting shaft 27 and moved in azimuth and elevation by actuators 10, 11, and 12. As noted previously, actuators 10, 11 and 12 may also be used to cause extension or contraction of the telescoping system, so as to move shaft 27 closer to or farther from wall 1.

FIG. 6 again shows details of the structure for mounting square tube 25 to pivot about pitch axis shaft 7a. In fact, elements of gimbal system 3 including shaft 7a, axial bores 111 and 111a, radial bores 112 and 112a, annular grooves 113 and 113a, and pivot block 116 and bores 114 and 114a therewithin are those elements previously discussed in connection with FIGS. 4 and 5 and are therefore correspondingly numbered in FIGS. 4, 5, and 6.

Tubes 25 and 26 will be spoken of as square in this specification, but it is to be understood that they may have other shapes such as octagonal or oval or any of several shapes other than circular so as not to permit relative rotation between tubes 25 and 26. As in FIG. 6, it is seen that tube 25 is a configuration of two individual square tubes 161 and 162. Tube 161 is composed of a self-lubricating plastic material, including materials such as polymerized fluorocarbon resins or kindred materials well known as providing relatively frictionless sliding bearing surfaces with relative freedom wear. The plastic tube 161 is fastened permanently at its interior surfaces to a mating square tube 162. In some applications of the manipulator system, the material chosen for tube 162 is aluminum selected to have a low copper content so as to minimize corrosion effects. The inner dimensions of aluminum tube 162 match external dimensions of pivot block 116, so that composite tube 25 may be fastened permanently to pivot block 116, as by bolts (not shown). At the opposite end of composite tube 25, a square block 169 may be similarly fastened within the interior of square aluminum tube 162.

At the interior surface of pivot block 116, a bore is provided within which is sealed at 168 by brazing, for example, a stainless steel tube 165. Tube 165 may be circular in cross section and extends to the inner surface of block 169, where a bore is provided so that tube 165 may be sealed within block 169 at 166, as by brazing. The interior of tube 165 couples to bore 114 in pivot shaft 7a so that hydraulic fluid may flow within tube 165. A similarly constituted stainless steel tube 165a is sealed at 168a within pivot block 116 in cooperating relation with bore 114a and also at 166a within block 169 similarly to convey hydraulic fluid relative to bore 114a. The elements above described as associated with telescoping sleeve 25 constitute one major portion of the telescoping tube system.

Those elements associated with the square tube 26, which again may be composed of corrosion resistant aluminum, constitute a second major portion of the telescoping tube system. Tube 26 is seen to fit in close slidable relation over the plastic tube 161 and is adapted to be translated relative thereto. The free end of tube 26 is closed by square pivot block 173, block 173 being fixed within tube 26, as by bolts (not shown). To aid tube 26 in performing its sliding bearing function over an extended life-time in relation to plastic tube 161, the interior surface of tube 26 may be provided with a black anodized film.

For providing a continuing passage for hydraulic fluid found in the interior of stainless steel tube 165, a cooperating stainless steel tube 167 is fastened within a bore in block 173, as by brazing at seal 172. Tube 167 has an outer diameter smaller than the inner diameter of stainless steel tube 165 and passes concentrically into tube 165 through a bore 174 in end block 169. The dimension of tubes 165 and 167 are so arranged that rubbing contact between their surfaces is avoided. As is readily seen, hydraulic fluid may thus pass through tubes 165 and 167 into the associated bore 176 in pivot block 173. An annular pressure gasket 170 surrounding tube 167 within end block 169 prevents undesirable loss of fluid past block surface 171.

In a similar manner, a passage for hydraulic fluid found in the interior of stainless steel tube 165a is provided by cooperating stainless steel tube 167a fastened within a second bore in block 173, as by silver brazing at 172a. Tube 167a also has an outer diameter smaller than the inner diameter of stainless steel tube 165a and passes concentrically into tube 165a through a bore 174a through end block 169. Thus, hydraulic fluid is conveyed through tubes 165a and 167a into the associated bore 176a in pivot block 173. Bores 176 and 176a respectively cooperate with annular grooves 177 and 177a and radial bores 182, 182a to supply independent fluid paths through shaft 27 for purposes yet to be explained. Shaft 27 is shown provided with keys 184, 184a which prevent it from turning relative to end block 173 for purposes yet to be described. Suitably arranged oil leakage prevention gaskets 179, 180, 181 may be supplied on each of the sides of annular grooves 177, 177a.

In operation, it is seen that two continuous separated paths that are both extensible and compressible are provided for the flow of hydraulic fluids from the pitch axis shaft 7a of the telescoping tube arrangement to and separately out of the pitch axis shaft 27 which supports the tool control system of FIG. 1. It is seen that such paths are continuous and permit undisturbed flow of hydraulic fluid whether or not actuators 10, 11, and 12 are changing the distance between shafts 7a and 27.

Figure 8:
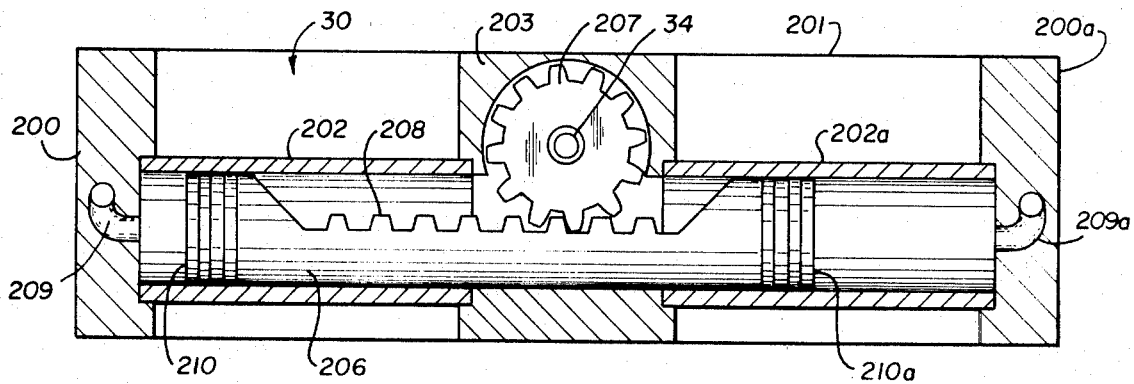
FIG. 8 is an elevation view in cross section of a hydraulic actuator used in the apparatus of FIG. 1.

Now, with reference to FIGS. 1, 7, and 8, the structure and operation of equipment mounted on pitch shaft 27 on the outer end of telescoping tube 26 will be generally discussed. Such apparatus, with the cooperative aid of actuators 10, 11, and 12, utilizes hydraulic fluid supplied via the telescoping tube system 25, 26 and through shaft 27, further to enable the operator advantageously to position a tool such as a drill or wrench that may be mounted in chuck 40. As has been observed, the apparatus mounted on shaft 27 comprises a first minor manifold system 28 including associated hydraulic actuators for pivoting system 28 about shaft 27, a major manifold system 29, and a second minor manifold system 30 including hydraulic actuators which controllably rotate the tool 34, 40 about the axis of shaft 34, 34a.

It is to be understood that similar positioning apparatus is provided to rotate minor manifold 28 about shaft 27 and to rotate the tool manifold 35 on shaft 34, 34a with respect to the second minor manifold 30 and therefore with respect to the major manifold 29 interposed between manifolds 28 and 30. As a matter of convenience, the structure and operation of the positioning apparatus for rotating shaft 34, 34a will be discussed first and thus the nature of the control system associated with shaft 27 will then become at once fully apparent.

From FIG. 1 and 7, it is seen that the major manifold 29 functions as a platform on which the dual part minor manifold 30,30a is fixedly mounted. Minor manifold parts 30,30a are seen to bear mutual mirror image relation to each other at least in external appearance. The function of minor manifold 30, for instance, is primarily to supply controlled flow of hydraulic fluid to a dual-cylinder hydraulic actuator comprising cylinders 202 and 202a cooperating with its central gear case 203. Rotatable shaft 34 extends from gear case 203 and gear case 203 is fastened to a wall 201 of manifold 30. Wall 201 is terminated by minor walls 200 and 200a at right angles thereto. Walls 200 and 200a form part of the high pressure hydraulic fluid distribution system and also form ends cooperating in retaining hydraulic fluid within the respective actuator cylinders 202 and 202a.

The hydraulic actuator comprising cylinder 202, gear box 203, and cylinder 202a is seen in more detail in FIG. 8 to be of the general type described, for instance, in the U.S. Pat. No. 2,844,128 to Carl Steiner, issued July 22, 1958 and elsewhere. As seen in FIG. 8, hollow cylinder 202 is closed on one end by a wall 200 of minor manifold 30 and at its opposite end, is open to the interior of gear box 203, being fixed therein. Similarly, hollow cylinder 202a is closed at one end by the wall 200a of minor manifold 30 and on its opposite end, is open to the interior of gear box 203, also being fixed therein. Cylinders 202 and 202a are coextensive with a passage of equal interior diameter through gear box 203, so that said passage accommodates and permits movement of a double ended (210,210a) piston 206. A portion of piston 206 between ends 210 and 210a is cut away to provide a flat plane on which a gear rack 208 is formed. Gear 207 within gear box 203 meshes with rack 208 and is locked to shaft 34. In the position of piston 206 shown in FIG. 8, high pressure hydraulic fluid has been introduced via channel 209a located in end wall 200a and the pressure on piston end 210a has forced piston 206 to the left in turn forcing hydraulic fluid out of the end of cylinder 202 adjacent piston end 210 through channel 209 in end wall 200 of minor manifold 30. Should high pressure fluid be commanded to flow through channel 209 and force against piston end 210, piston 206 will move to the right and fluid will exit via channel 209a in end wall 200a. Consequently, gear 207 and shaft 34 are rotated clockwise or vise versa in dependence upon the admission of high pressure fluid via channel 209 or via channel 209a.

Shaft 34 is seen in FIG. 7 to extend through the tool manifold box 35 mounted thereon and keyed thereto, so that a portion of 34a of the shaft controlled by actuator 202, 203, 202a is journalled in wall 201a of minor manifold 30a. Tool manifold box 35 is rotated by 90° on shaft 34, 34a in FIG. 7 with respect to its position in FIG. 1 as a matter of convenience in showing the structure of the device. A design choice may be made to place a second actuator system cooperating with actuator 202,203, 202a in association with manifold 30a. The presence of such an actuator is indicated in FIG. 7 by the showing in the figure of its gear box 204. Minor manifold 30a and its associated end walls 200b and 200c cooperate with gear box 204 to supply controlled hydraulic fluid to the cylinders and piston of the actuator associated with gear box 204.

The hydraulic actuators associated with gear boxes 203 and 204 are cooperatively controlled by the electrically actuated electromechanical actuator and hydraulic differential control valve 32, which may be mounted on a surface of the wall portion 201a of minor manifold 30a. As will be seen with reference to FIGS. 9 and 10, hydraulic channels in manifolds 29, 30, 30a cooperate with actuator and differential control valve 32 in the cooperative control of the hydraulic actuators 203, 204 for torquing shaft 34,34a. The device 32 may again be similar to the electromechanical actuator and differential control valve system of the Engelbrecht et al. U.S. Pat. No. 3,033,171, issued May 8, 1962.

As previously noted, shafts 34,34a have hollow channels for the purpose of transmitting hydraulic fluid into and out of tool manifold 35 for operation of a hydraulic tool-operating motor within casing 39. Operation of said motor is again determined by an electrically actuated electromechanical actuator and differential control valve system 33 located on one side of tool manifold 35. The device 33 may again be a conventional control device, including such a device as disclosed in the above mentioned Engelbrecht et al. U.S. Pat. No. 3,033, 171. Here, the control device 33 is arranged in a well known way to control the sense of rotation and the rotational speed of a hydraulic motor within casing 39, consequently to control operation of chuck 40 and the tool it may be holding.

Figure 9:
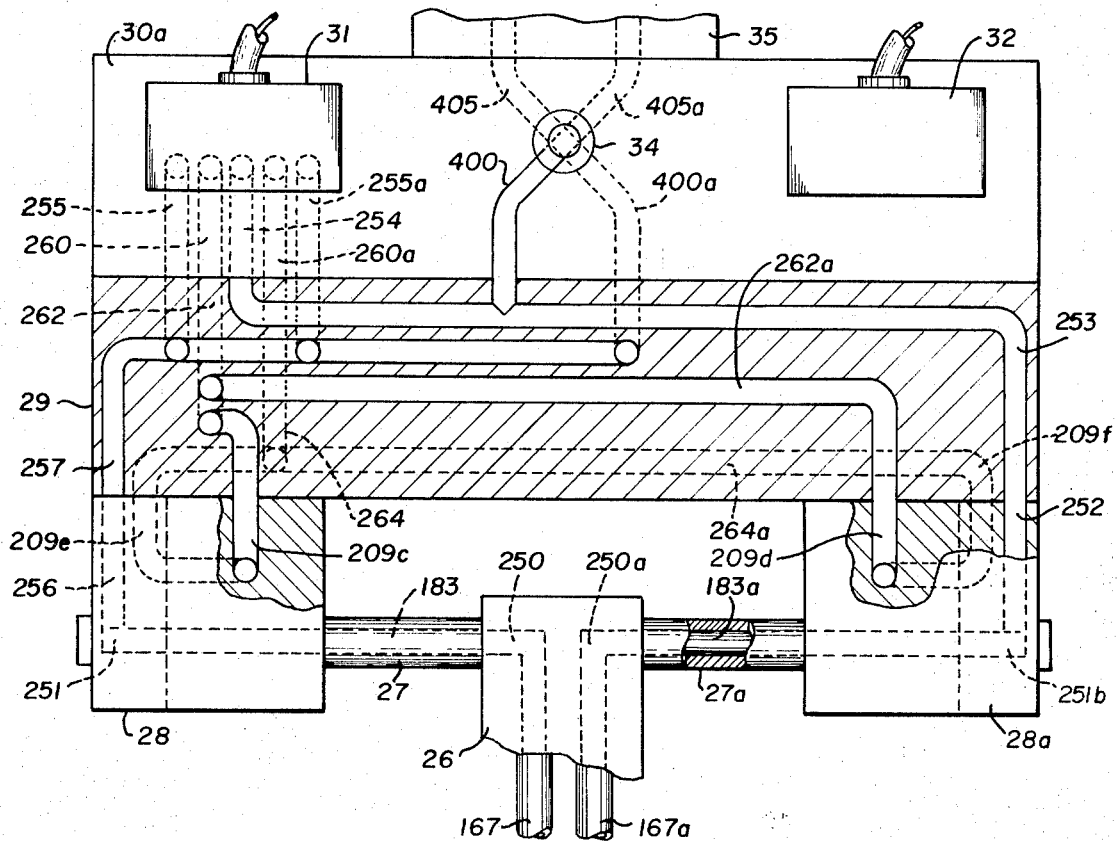
FIG. 9 is a plan view, partly in cross section, of part of the apparatus shown in FIG. 7.
Figure 10:
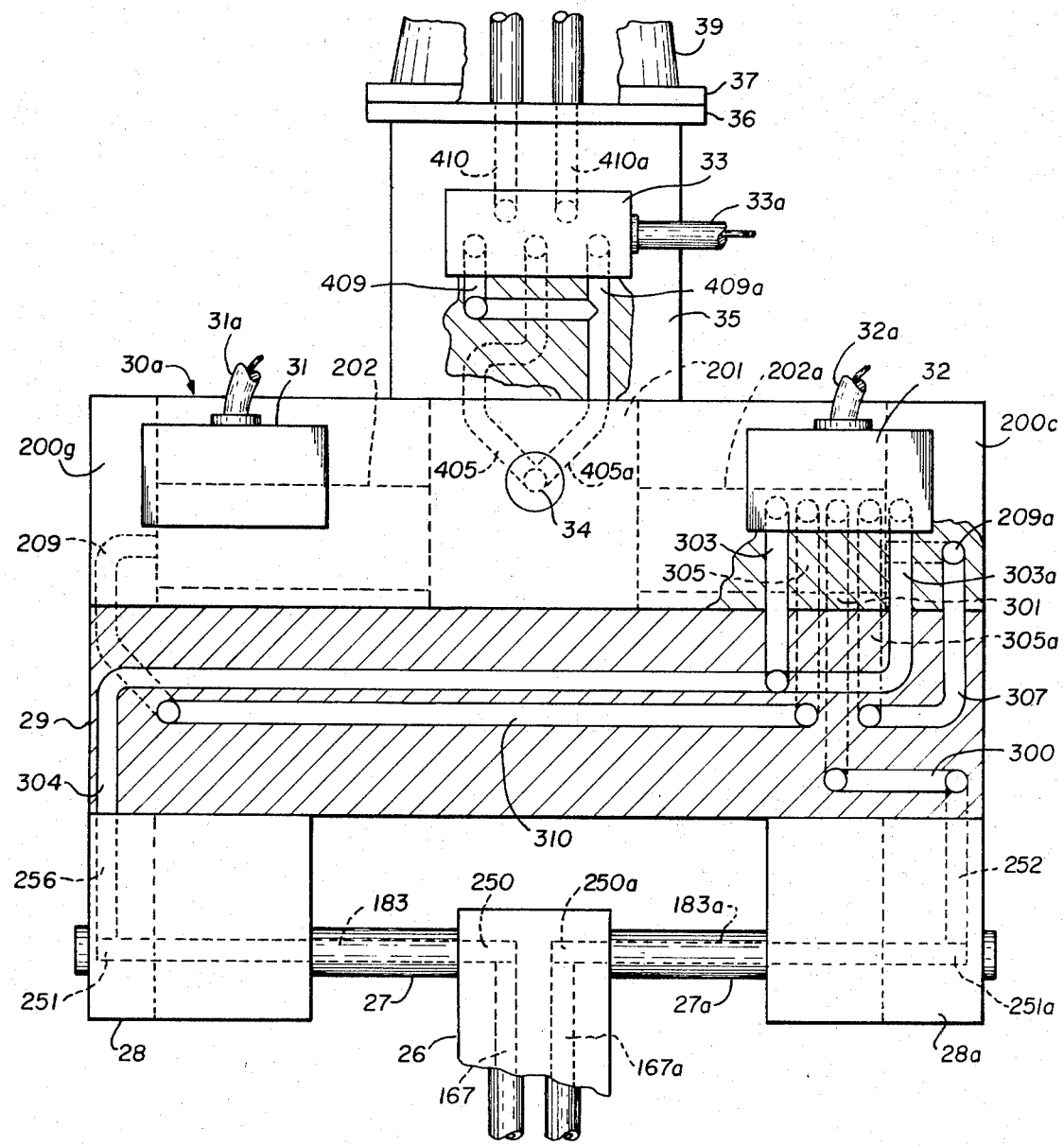
FIG. 10 is similar to FIG. 9.

Some details of the hydraulic system for operation of the actuators for torquing the azimuth axis shaft 34, 34a and for controlling the tool motor in casing 39 are yet to be considered in connection with FIGS. 9 and 10. FIGS. 9 and 10 will also fully illustrate the fact that the control system above described for movement of the tool manifold 35 and its supported tool system in azimuth on shaft 34, 34a is fundamentally the same as the control system for movement of major platform 29 in pitch on shaft 27 about the axis of shaft 27. For example, shaft 27 is hollow in order to supply high pressure hydraulic fluid into minor manifold 28 and thence into manifolds 29 and 30. Shaft 27 is keyed to the telescoping tube 26. Hydraulic dual cylinder actuators like actuator 202, 203, 202a are found in minor manifolds 28 and 28a. These include hydraulic cylinders with gear racks cooperating with gears keyed to shaft 27. Command signals issued by electrically actuated electromechanical actuator and differential control valve system 31 cause the actuators associated with minor manifolds 28, 28a to move the minor manifolds 28, 28a around shaft 27, thus similarly moving major platform 29 in pitch. Control device 31 is understood to be similar to control devices 32 and 33.

The internal hydraulic channels within the manifolds of FIG. 7, as illustrated in FIGS 9 and 10, will be discussed so as to contribute to a complete understanding of the structure and operation of the invention. The general locations of the various channels in FIGS. 9 and 10 are chosen purely for explanatory purposes, and it is understood that in actual practice, these locations may be considerably altered. For example, annular grooves or hydraulic slip rings such as are shown in detail in FIG. 6 are illustrated schematically at 250 and 250a as respectively coupling tubes 167 and 167a found in the square telescoping tube 26 to channels 183 and 183a in shaft 27,27a. Similar annular grooves or hydraulic slip rings may be found at 251 and 251a where the shaft 27,27a respectively conveys hydraulic fluid to manifolds 28, 28a, manifolds 28, 28a being rotatable relative to shaft 27, 27a.

First to be traced will be fluid channels through minor manifolds 28, and 28a, major manifold 29, and minor manifold 30a as required for the operation of dual piston torque motors operating about the azimuth axis coinciding with the axis of azimuth shaft 27, 27a. Thus, fluid may flow through tube 167a, slip ring 250a, bore 183a, and slip ring 251a into a channel 252 provided in minor manifold 28a. Channel 252 matches channel 253 in major manifold 29 which, in turn, couples fluid into channel 254 in minor manifold 30a. Channel 254 couples fluid into the hydraulic valve system of the electrically actuated electromechanical actuator and hydraulic differential control valve 31. A second channel connected to the conventional dual ports 255, 255a of control device 31 includes corresponding elements as tube 167, hydraulic slip ring 250, bore 183; slip ring 251 in minor manifold 28, channel 256 in minor manifold 28, and channel 257 in major manifold 29 which couples to ports 255, 255a.

As has been seen, the differential control valve of device 31 determines according to the electrical command supplied to it, which of two additional ports of device 31 is to be supplied with hydraulic fluid under pressure; these two additional ports are ports 260 and 260a. Port 260 is coupled through channel 262 in major manifold 29 to channel 209c in minor manifold 28. Similarly, port 260 is coupled through channel 262a in major manifold 29 to channel 209d in minor manifold 28a. Channels 209c and 209d respectively connect to corresponding ends of dual piston actuators whose respective gears (like gear 207 in FIG. 8) are keyed to shaft 27, 27a; i.e., hydraulic fluid under pressure entering channels 209c and 209d operates the respective hydraulic piston actuators so that they apply torques to shaft 27, 27a in the same sense.

Beneath the plane of the drawing of FIG. 9 is a second and corresponding hydraulic fluid channeling system shown in dotted lines. For example, port 260a is coupled through channel 264 in major manifold 29 to channel 209e in minor manifold 28. Similarly, port 260a is also coupled through channel 264a in major manifold 29 to channel or port 209f in minor manifold 28. Channels 209e and 209f respectively connect to the other two corresponding ends of the dual piston actuators associated with shaft 27, 27a; i.e., hydraulic fluid under pressure entering channels 209e and 209f operates the respective dual cylinder hydraulic piston actuators so that they apply torques to shaft 27, 27a in the same sense, but in a sense opposite to that produced by fluid flow into ports 209c and 209d.

The structure and operation of the apparatus for applying torques to shaft 27, 27a will be further understood with reference to the following description of the analogous system of FIG. 10 for producing torques about azimuth shaft 34, 34a. The elements cooperating in this latter function include certain elements previously discussed in connection with FIG. 9 for supplying torque about pitch shaft 27, 27a. Such elements include the schematically illustrated slip rings 250 and 250a which respectively couple tubes 167 and 167a to channels 183 and 183a in shaft 27, 27a. Also included are the similar hydraulic slip rings 251 and 251a used respectively to convey hydraulic fluid from shaft 27,27a into the manifold 28, 28a.

In FIG. 10, it is desired to trace the hydraulic fluid channels into the minor manifolds 28 and 28a, major manifold 29, and minor manifold 30, 30a, especially such hydraulic channels as are required for the operation of dual piston torque motors such as the torque motor including cylinders 202 and 202a operating about the pitch axis coinciding with the axis of azimuth shaft 34,34a. Thus hydraulic fluid may be caused to flow through tube 167a, slip ring 250a, bore 183a, slip ring 251a, and the channel 252 provided in minor manifold 28a. Channel 252 matches a channel 300 in the major manifold 29 which, in turn, couples hydraulic fluid into channel 301 in minor manifold 30a. Channel 301 has the purpose of coupling fluid into the hydraulic valve system of the electrically actuated electromechanical actuator and hydraulic differential control valve 32.

A second channel connected to the conventional dual ports 303, 303a of control device 31 includes such corresponding fluid transmission elements as tube 167 found in the square telescoping tube 26 along with hydraulic slip ring 250, bore 183 in shaft 27, slip ring 251 in minor manifold 28, channel 256 in minor manifold 38, and channel 304 in major manifold 29 which couples to two ports 303 and 303a.

As has been seen in the instance of the analogous device 31 in the discussion of FIG. 9, the differential control valve of device 32 determines according to an electrical command signal supplied to it which of two further ports on device 32 are supplied with hydraulic fluid under operation these two ports are ports 305 and 305a. Port 305a is coupled through channel 307 in major manifold 29 to channel 209a in minor manifold 30a, particularly in the wall 200c thereof. Similarly, port 305 is coupled through channel 310 in major manifold 29 to channel 209 in the wall portion 200b of minor manifold 30a.

As seen by comparison of FIGS. 8, 9, and 10, channels 209 and 209a respectively connect to corresponding opposite ends of the dual piston actuator comprising cylinders 202 and 202a and gear box 209. Gear box 209 contains a gear like gear 207 of FIG. 8 actuated by the device and keyed to shaft 34; i.e. hydraulic fluid under pressure entering channels 209 or 209a translates the associated hydraulic piston 206 to apply torque in one sense or another to shaft 34, thus moving the tool manifold 35 about the shaft 34 in a corresponding manner.

A second hydraulic actuator may be coupled to shaft 34 at the end of said shaft below the plane of the drawing of FIG. 10. Suitable channels are connected through the minor manifold 30 encompassing this actuator, whose gear box is shown at 203 in FIG. 7, so that hydraulic fluid is admitted to one or the other of its piston, applying torque to shaft 34 always in the same sense as torque is applied by the actuator system involving cylinders 202 and 202a and gear box 201. It is to be understood that suitable motion limit stop mechanisms can be applied to determine the boundaries of allowable rotation of shafts 34 and 27. Such limit stops, for instance, may be adapted to remove power from the actuator at a selected limit position so that incorrect commands instituted by the operator cannot damage the equipment.

In FIGS. 1, 9 and 10, it is seen that there are fluid connections for tubes 167, 167a into the major manifold 29 directly to two respective fluid paths 400, 400a passing through minor manifold 29 each separately into minor manifold 30 and 30a in the form of respective channels 400, 400a. As seen in FIG. 1, and 9, channel 400 may pass through a hydraulic slip ring 402 of the general kind described in connection with FIGS. 4 and 5, and thence into a hydraulic channel 405 in the tool manifold block 35. Similarly, there is a passage from the tube 167a in telescoping tube 26 via channels 252 and 253 through channel 400 and slip ring 402a into channel 405a. Channel 405 couples fluid into the hydraulic valve system of the electrically actuated electromechanical actuator and hydraulic control valve 33. Channel 405a is connected to the conventional dual ports 409 409a of the control device 33.

As is seen in FIG. 10, the differential control valve of device 33 determines according to the electric command signal applied to it, which of the ports 410 and 410a will be supplied with hydraulic fluid under pressure. Channels 410, 410a supply such fluid under operation and a return path for it with respect to whatever conventional hydraulic motor may be located in motor casing 39 for the operation of chuck 40 or other tool. Each of the control devices 31, 32, and 33 may be controlled as were control devices 56, 57 seen in FIG. 2 by a separate electrically controlled circuit 50 described in detail in connection with FIG. 3.

FIGS. 11 and 12 represent manual control apparatus for the positioning of the manipulator system with respect to its various axes in the form of a hand grip system for operating control switches performing functions such as those of the individual switches 55, 55a, and 55b of the electronic controllers 50, 50a and 50b, respectively, of FIG. 2. In FIGS. 11 and 12, it is seen that the hand grip 530 may be angularly moved forward or backward about pivot 531 in carrier 561 with respect to switch base 535. Furthermore, as especially shown in FIG. 12, the hand grip 530 may be angularly moved to the operator's left or to his right with respect to pivot 572 within carrier 561. The motion of hand grip 530 is resisted by restoring forces provided about pivot 531 by springs 533 and 533a and about pivot 572 by springs 573 and 573a; these springs also restore hand grip 530 to its neutral or vertical position when manual force is not being exerted against it. Springs 533, 533a operate between base 535 and carrier 561, while springs 573, 573a operate between carrier 561 and the hand grip 530 of the restoring purpose.

Components of switch 55 are mounted on base 535 and are actuated by movement of carrier 561 about pivot 531. Carrier 561, being equipped with cam ridges 532, 532a, is adapted to cause switch blade 500 to touch contact 500a when grip 530 is moved forward in the sense of arrow F. On the other hand, if grip 530 is moved in the opposite sense, contact 501a is touched by switch blade 501. Thus a motor drive circuit connected to the blades 500, 501 of switch 55 may be, at the will of the operator, connected through contact 500a or 501a to a source of positive or negative potential.

Components of switch 55a are located on carrier 561 and are actuated by moving grip 530 about pivot 572. The base of grip 530 is equipped with cam edges 540, 540a and is thereby adapted to cause switch blade 502 to touch an associated contact 502a when grip 530 is moved to the operator to his right (in the sense of the arrow R in FIG. 12). Conversely, if grip 530 is moved in the opposite sense, contact 503a is touched by switch blade 503. Thus, a motor drive circuit connected to the blades 502, 503 of switch 550 may be, at the will of the operator, connected through contacts 502a or 503a to potential sources. A similar switch 55b is also located on carrier 561 for operation by hand grip 530 when moved about pivot 572. The components of switch 55b are leaf springs or blades 504 and 505 and the associated contacts 504a and 505a (contact 505a is not seen in FIGS. 11 and 12, being hidden from view in FIG. 11 by blade 505 and being likewise hidden in FIG. 12 since it is behind contact 503a). Switch 55b is likewise seen to be adapted to connect a motor drive circuit connected to the blades 504 and 505 through contacts 504a, 505a to respective unidirectional voltage sources of opposite polarity.

When the operator desires to rotate the expansible telescoping system 25, 26 clockwise about pivot axis 9a of FIG. 1, thus lowering the tool system, hand grip 530 is moved forward, as indicated by arrow F, about pivot 531, against the centering force exerted by spring 533. The switch corresponding to switch 55 of FIG. 2 is brought out of its neutral (inactive) condition, because cam surface 532 forces spring switch blade 500 to meet electrical contact 500a. It is seen that this event can also be illustrated in FIGS. 1 and 4 by the contacting of the blades of switch 55 of electronic controller 50 to the terminal attached to lead 85 of potentiometer 84. Such an event causes electromechanical actuator 56 and differential valve control 58 to operate lineal hydraulic motor 10 so that the output arm 17 is extended, thus lowering the tool system. When the operator observes that the tool system is sufficiently lowered, release of hand grip 530 permits springs 533, 533a to return the switch to its original inactive position. It is understood that the operator is positioned on the arrow B side of hand grip 530 in FIG. 11.

Should the operator desire to raise the tool system by rotating the expansible system 25, 26 counterclockwise about pivot 9a of FIG. 1, he moves hand grip 530 back, as indicated by arrow B, about pivot 531. Switch 55 is again brought out of its neutral position, because cam surface 532a forces spring switch blade 501 to meet electrical contact 501a (note that blades 500 and 501 must be electrically connected together). It is seen that this event can also be illustrated with reference to FIGS. 1 and 4 by the contacting of the blade of switch 55 of electronic controller 50 to the terminal connected to lead 85a of potentiometer 84a. Such an event causes electromechanical actuator 56 and differential valve control 58 to operate lineal hydraulic motor 10 in an opposite sense so that the output arm 17 is withdrawn into motor 10, thus elevating the tool system. It is observed that in the mode of operation in which the tool system is to be raised or lowered, only motor 10 is operated, motors 11 and 12 being permitted to hold a fixed position.

When the operator needs to move the tool system to the left or to the right (in azimuth angle about pivot axis 9 in FIG. 1), it is clear that he has the option of manually controlling lineal hydraulic actuators 11 and 12 (FIGS. 1 and 2) so that one actuator expands while the other contacts, allowing actuator 10 to hold its position. This he can do, for example, by moving switch 55a of electronic control element 50a to command lineal hydraulic actuator 11 to expand, while simultaneously moving switch 55b of electronic control element 50b in an opposite sense so as to command lineal hydraulic actuator 12 to contract. Such action causes the tool system to be swung to the left or behind the plane of the drawing of FIG. 1. Conversely, it is evident that switches 50a and 50b may be simultaneously manipulated in the opposite senses; i.e., so that actuator 11 contracts while actuator 12 expands. Such action causes the tool system to be swung to the right or out of the plane of the drawing of FIG. 1.

Hand grip 530 permits versatile operation of the manipulator in azimuth by incorporating the functions of switches 55a and 55b in a simple manner; i.e., it provides means for readily operating actuators 11 and 12 simultaneously in opposite senses. Referring to FIGS. 11 and 12, it is observed that hand grip 530, when operated to the operator's right or left about pivot 532, disturbs the neutral (inactive) status of switches 55a and 55b, which switches correspond to the switches bearing the same reference numerals shown on electronic control elements 50a and 50b of FIG. 2. Should the operator move hand grip 530 to his right, switch blades 502 and 505 close against respective contacts. Blade 502, being a part of switch 55a of electronic control 50a, then causes actuator 11 to contract. Blade 505, being a part of switch 55b of electronic control 50b, causes actuator 12 to expand. This comes about because blades 502 and 505 are operated by the first cam surface 540 associated with pivot 572.

The crossed-over connection also is betrayed by the fact that the second cam surface 540a associated with pivot 532 operates switch blades 503 and 504 when the operator moves hand grip 530 to his left. Thus, when the operator moves hand grip 530 to his left to produce a corresponding leftward swing of the manipulator, switch blades 503 and 504 close against respective contacts. Blade 503, being a part of switch 55a of electronic control 50a, then causes actuator 11 to expand. Blade 504, being a part of switch 55b of electronic control 50b, causes actuator 12 simultaneously to contract. It is seen that blades 502 and 505 are to be electrically connected together. Also blades 503 and 504 must be electrically connected together.

It is seen from FIGS. 2 and 3 that simultaneous extension of the telescoping system 25, 26 is produced by simultaneous operation of lineal hydraulic motors 10, 11, and 12 so that the extensible arms 17, 18 and 19 move out simultaneously. Retraction of system 25, 26 is correspondingly brought about by causing arms 17, 18, and 19 to be moved back into their respective motors 10, 11, and 12. It is readily seen from the foregoing that the operator may command the expansion event by properly positioning switches 55, 55a, and 55b. The contraction event may correspondingly be had when switches 55, 55a, 55b are moved to an opposite position.

A special mode of operation of switch blades 500 and 501 in FIG. 11 accomplishes the above simultaneous expansion or contraction kind of operation. Should the operator desire to extend arms 17, 18, 19, hand grip 530 is grasped and trigger 563 is squeezed, thus actuating switch blade 560 so that it contacts 560a, elements 560 and 560a being mounted at 562 within the casing of hand grip 530. Actuation of switch 560, 560a may then cause, for example, a relay to connect in similar polarity sense the three sets of inputs to electromechanical actuators 56, 56a, and 56b to one command switch, such as switch 55 associated with pivot 531. It is thus readily seen that movement of hand grip 530 forward while switch 560, 560a is closed causes motors 10, 11, and 12 to operate so that telescoping system 24, 25 expands, moving the tool system radially away from wall 1. On the other hand, when the operator pulls hand grip 530 back toward him in the sense of arrow B and squeezes switch trigger 563, the motors 10, 11, and 12 respond by withdrawing respective arms 17, 18, and 19, so that the tool system moves back toward wall or support 1.

Should it be desired to retain the advantages in the system for enlarging and diminishing the distance between support wall 1 and the tool system, of the features of the circuit of FIG. 3, it is clear that the relay operated by switch 560, 560a can readily be adapted to retain electronic control circuits 50, 50a, and 50b in circuit and that it may be equally readily adapted to operate switch contacts corresponding to switches 55, 55a, and 55b in the respective control circuits 50, 50a, and 50b so that equal amplitude, equal polarity command signals are injected into the respective electromechanical actuators 56, 56b, and 56c so as to produce equal magnitude, common direction movement of actuator arms 17, 18, and 19, either for extension of the tool system or for its reaction.

The functions of electromechanical actuators 31, 32, and 33 (FIGS. 7 and 10) have been considered in detail; as in FIG. 10, it has been seen that the senses of operation of actuators 31, 32, and 33 are controlled by electrical command signals supplied thereto via the respective electrical cables 31a, 32a, 33a. Hand grip 530 may also be employed to provide a source of such command signals through the agency of switch 550 mounted in the upper portion of the casing of hand grip 530.

Switch 550 is a conventional spring centered, four-active-position switch with the fifth neutral central position being always inactive. When the operator pushes switch key 550a forward in the sense of arrow F, electrical power is provided to actuator 31 so as to cause rotation of the tool mounting system downward with respect to pitch axis 27, 27a (FIG. 10). If the operator pulls key 550a back toward him, power is provided to actuator 31 so as to cause rotation of the tool mounting system upward with respect to axis 27, 27a.

The operator may independently exercise control motion about the azimuth axis 34. Motion clockwise about axis 34 is caused when the operator moves key 550a to his right so as to complete an appropriate electrical voltage circuit to electromechanical source actuator 32. Motion of tool 39, 40 counter-clockwise is provoked when key 550a is similarly moved to the operator's left.

The several modes of control which may be exercised over the apparatus and their benefits emphasize the great versatility of the present invention. It is seen from the foregoing discussion of the manipulator system and its controls that independent controls are afforded over parts associated with independent degrees of freedom, and that cooperative modes of control are available where cooperative functions are beneficially performed. For example, the control configurations associated with the extensible elements 25 and 26 permits rapid location of the tool supporting platform or manifold system comprising elements 28, 29, and 30 in the near vicinity of the object selected for manipulation or modification by the tool. Further, it is seen that a second independent control configuration may then be brought to bear on the problem of positioning tool 39, 40 in exactly the position required by the relative disposition of the object to be worked upon by the tool with respect to the extensible or telescopable system 25, 26. It is seen that this second configuration involves the active participation of control systems for operation about the independent axes 27 and 34 associated with manifold systems 28, 29, and 30.

A third independent control may be provided that exercises control over the operational speed of the tool selected, and of its sense of operation as in the sense of rotation of a drill, wrench, or saw, as examples. This is readily achieved because hydraulic fluid under pressure is readily brought from manifold system 28, 29, and 30 into the tool manifold 35. By reference to FIGS. 7 and 10, it is seen that reversible electric command signals may be supplied by a circuit like that of FIG. 4 to the electrical leads 33a of electromechanical actuator and differential valve system 33 for control of the sense of rotation of the hydraulic motor within motor casing 39. Should it be desired to control the operating speed of said motor, a tool control rheostat placed in lead 88 of FIG. 3 may be readily used for the purpose.

The present invention is particularly well suited, for example, for use with the apparatus disclosed in U.S. patent application Ser. No. 9,759 entitled Remotely Controlled Unmanned Submersible Vehicle invented by Gerald R. Keatinge, filed concurrently herewith and assigned to the same assignee as the present invention.

While the invention has been described in its preferred embodiment, it is to be understood that the words that have been used are words of description rather than limitation and that changes within the purview of the appended claims may be made without departing from the true scope and spirit of the invention in its broader aspects.

I claim:

1. A manipulator device adapted to be supported for angular and radial motion relative to a support means, for positioning tool means, comprising:
   first telescopable means adapted to be pivotably secured to said support means,
   second telescopable means cooperatively associated with said first telescopable means and adapted pivotably to support said tool means, and
   plural motor means each having lineally extensible means,
      each said motor means being adapted to be pivotably secured to said support means, and
      each said extensible means being pivotably secured to said second telescopable means.

2. Apparatus as described in claim 1 wherein said first and second telescopable means telescope one within the other in closely contiguous slidable relation for providing a passively extensible means.

3. Apparatus as described in claim 2 wherein said first and said second telescopable means are arranged and configured for inherent prevention of rotation of one telescopable means within the other.

4. Apparatus as described in claim 3 wherein said passively extensible means includes plural, separated passages therethrough permitting continuity of fluid flow.

5. Apparatus as described in claim 4 comprising:
   first pivot means affixed to an end of said telescopable means,
   second pivot means affixed to an end of said second telescopable means,
   said first and said second pivot means having plural, separated passages therethrough permitting continuity of fluid passages in and
   said plural passages through said pivot means being connected to respective ones of said plural passages in said passively extensible means for permitting continuity of fluid flow through said first pivot means, through said passively extensible means, and through said second pivot means for supply of fluid to said tool means.

6. Apparatus as described in claim 1 wherein said motor means comprises:
   pivot means having plural, separated passages therethrough for permitting continuity of fluid flow, and
   fluid passage means connected to said pivot means and to said motor means for permitting continuity of fluid flow through said pivot means and through said fluid passage means with respect to said motor means.

7. Apparatus as described in claim 6 including control means adapted to control fluid under pressure for flow within said passages of said motor pivot means to said motor means for operation thereof for the purpose of controlling the angular and radial position of said tool means with respect to said support means.

8. Apparatus as described in claim 7 wherein said control means is adapted to cause substantially simultaneous opposite operation of at least two of said motor means for the purpose of controlling the angular position of said tool means with respect to a predetermined axis adjacent said support means.

9. Apparatus as described in claim 7 wherein said control means is adapted to cause substantially simultaneous like operation of said motor means for the purpose of controlling the radial position of said tool means with respect to said support means.

10. Apparatus as described in claim 1 comprising:
    first pivot means affixed to said second telescopable means,
    manifold means journaled on said first pivot means,
    manifold pivot means substantially perpendicular to said first pivot means and journaled on said manifold means,
    first manifold motor means for positioning said manifold means with respect to said first pivot means,
    second manifold motor means for positioning said second pivot means with respect to said manifold means, and means for mounting a tool on said second manifold pivot means.

11. Apparatus as described in claim 10 comprising:
plural fluid passage means within said first pivot means affixed to said second telescopable means adapted to permit continuity of fluid flow with respect to a fluid supply,
plural fluid passage means within said manifold means connected to said plural fluid passage means within said first pivot means affixed to said second telescopable means, and
remotely operated fluid flow control means respectively controlling fluid flow through said manifold means for independent control of said first and second manifold motor means.

12. Apparatus as described in claim 11 comprising:
remotely operated fluid flow control means controlling fluid flow in said manifold means and adapted independently to control operation a tool mounted on said second manifold pivot means.

13. Tool positioning means for positioning a tool, adapted to be mounted for angular motion relative to first pivot means, comprising:
manifold means,
first motor means affixed on said manifold means in driving relation with said first pivot means for rotating said manifold means in relation to said first pivot means about a first pivot axis,
second pivot means,
second motor means affixed on said manifold means in driving relation with said second pivot means for rotating said second pivot means in relation to said manifold means about a second pivot axis and third motor means supported by said second pivot means for driving said tool.

14. Apparatus as described in claim 13 wherein said first pivot means and said manifold means have plural separated passages therethrough permitting continuity of fluid flow through said first pivot means and said manifold means for driving said first and said second motor means.

15. Apparatus as described in claim 13 wherein said first pivot means, said manifold means, and said second pivot means have plural separated passages therethrough permitting continuity of fluid flow through said first pivot means, said manifold means, and said second pivot means for driving said third motor means.

16. Apparatus as described in claim 14 including control means affixed on said manifold means adapted to control fluid under pressure to flow within said passages for selectively driving one of said first and said second motor means.

17. Apparatus as described in claim 15 including control means supported by said second pivot means adapted to control fluid under pressure to flow within said passages for driving said third motor means.

18. A manipulator device adapted to position tool means in radial and spherical angular coordinate relation with respect to an object upon which said tool means is adapted to perform useful work, comprising:
support means,
telescopable means having first and second cooperative parts,
plural lineally expansible first motor means pivotally secured in tripod fashion with respect to said support means,
said first motor means being adapted to move said first cooperative part of said telescopable means with respect to said support,
platform means pivoted upon said first cooperative part of said telescopable means about a first axis,
said platform means being adapted pivotally to support said tool means about a second axis,
second motor means for positioning said tool means about said first and said second axes,
said first motor means being adapted to position said platform means radially and angularly with respect to said support means in substantially contiguous proximity with said object, and
said second motor means being adapted angularly to position said tool means in working alignment with said object whereby said tool may perform useful work upon said object.

19. Apparatus as described in claim 18, wherein said second cooperative part of said telescopable means is pivotally secured to said support means.

20. Apparatus as described in claim 19, wherein said telescopable means and said platform means have plural separated passages therethrough permitting continuity of fluid flow through said telescopable means and said platform means for operation of said second motor means.

21. Apparatus as described in claim 20 including control means supported by said platform means adapted to control fluid under pressure to flow within said passages for driving said second motor means.

22. Apparatus as in claim 18 wherein said second motor means comprises:
first hydraulic motor means for moving said platform about said first axis,
second hydraulic motor means for moving said tool means about said second axis relative to said platform,
said first and said second hydraulic motor means being affixed to opposite sides of said platform means, and
said first and said second axes being in mutually perpendicular relation.

23. Apparatus as in claim 18, wherein said tool means includes variable speed, reversible hydraulic motor means pivotally supported about said second axis.

* * * * *